United States Patent [19]
Carstensen

[11] 4,298,112
[45] Nov. 3, 1981

[54] SIX LEVER RACING CLUTCH

[75] Inventor: Franklin E. Carstensen, Garden Grove, Calif.

[73] Assignee: American Industries Inc., Cleveland, Ohio

[21] Appl. No.: 105,316

[22] Filed: Dec. 19, 1979

[51] Int. Cl.³ .............................................. F16D 13/44
[52] U.S. Cl. ................. 192/70.29; 192/70.13; 192/99 A
[58] Field of Search ................ 192/70.13, 70.29, 70.3, 192/99 A

[56] References Cited

U.S. PATENT DOCUMENTS

| | | | |
|---|---|---|---|
| 2,038,017 | 4/1936 | Wemp | 192/99 A |
| 2,163,971 | 6/1939 | Zeidler | 192/70.29 |
| 2,206,988 | 7/1940 | Wemp | 192/70.29 |
| 3,334,716 | 8/1967 | Spokas | 192/99 A X |

FOREIGN PATENT DOCUMENTS 590562  7/1947  United Kingdom ............. 192/99 A

*Primary Examiner*—Allan D. Herrmann
*Attorney, Agent, or Firm*—Browdy and Neimark

[57] ABSTRACT

A long lever clutch suitable for racing has a lever arm with the centers of the yoke pivot hole and the pressure plate billet pivot hole in a line parallel with the beam surface of the lever. An opening at the external end of the lever permits the addition of bob weights. This design permits control of the internal centrifugal force so that the excessive pressure is not applied to the pressure plate at high rpm. The clutch can also be modified from the 6-lever configuration to a 3-lever mode. Replaceable thrust and lever shims are used to reduce clutch wear.

12 Claims, 15 Drawing Figures

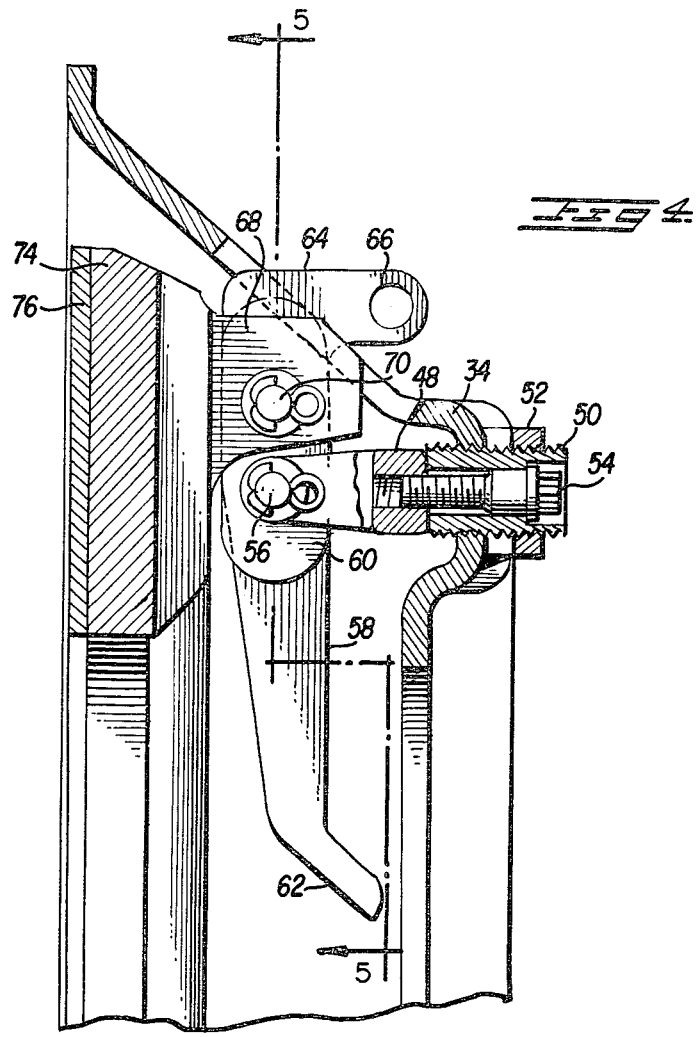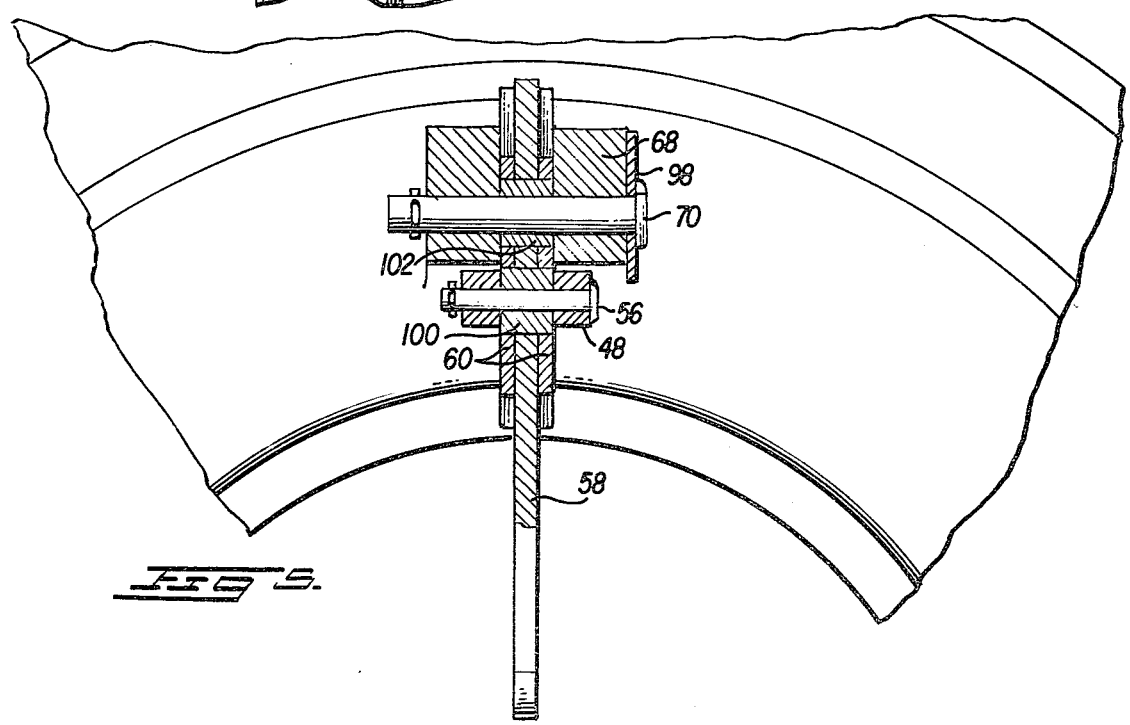

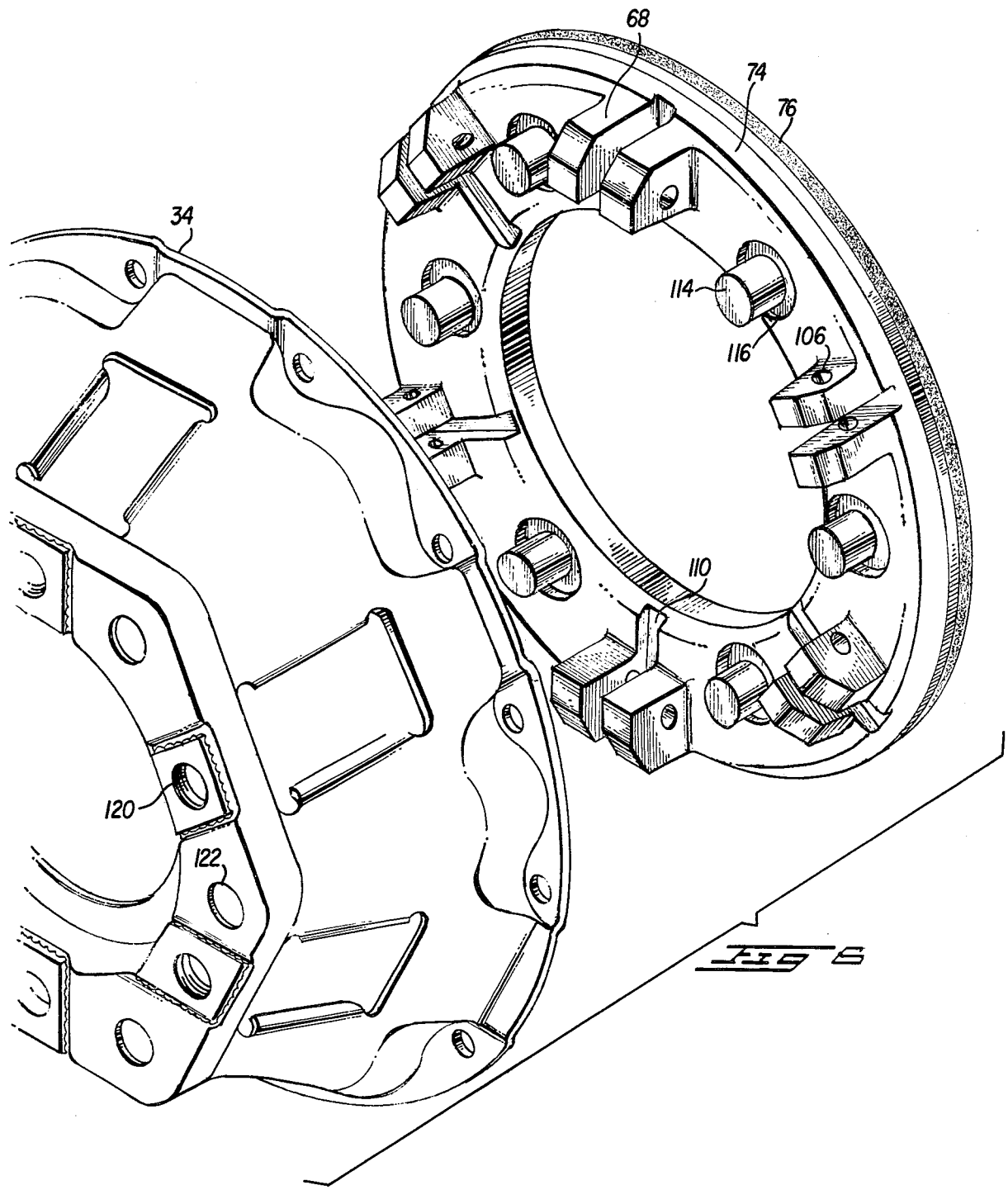

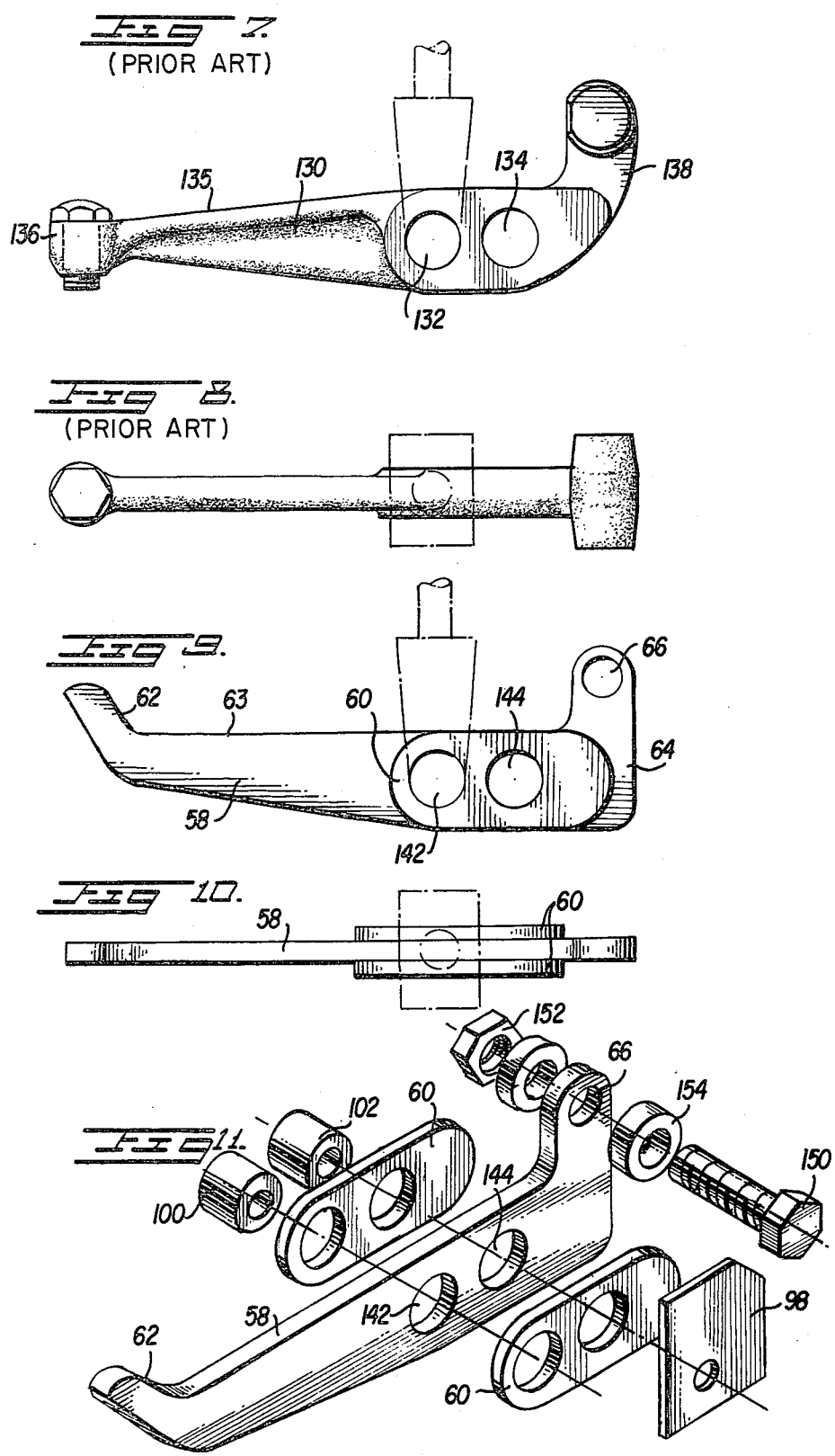

SIX LEVER RACING CLUTCH

BACKGROUND OF THE INVENTION

1. Field of the Invention

The present invention relates to a clutch suitable for racing and, more particularly, to a uniquely designed long lever arm to be used in the clutch.

2. Description of the Prior Art

Racing clutches with long lever arms have one end portion of the lever which is internal of the yoke pivot point and the opposite end portion which is external. In these conventional designs, the lever arms are offset to the extent that the center of gravity is located substantially on the internal portion. In other words, a substantial part of the weight of the lever is located internally of the pivot point. The reason for this center of gravity offset is for ease of mechanical disengagement.

A problem existing for these devices is that as the clutch wears down (on the order of 0.015 inch) the position of the lever arm has to be adjusted to move the pressure plate further towards the clutch pack. For this amount of wear, it is usual to have a $1\frac{1}{2}°$ change in the lever angle. However, as the internal part of this lever arm moves up $1\frac{1}{2}°$, the external centrifugal force becomes less dominating and the internal centrifugal force becomes more dominating. This result occurs because each lever arm has a center of gravity point located on the internal position of the lever arm. As the centrifugal force increases, the center of gravity is pulled outwardly which in turn causes the lever arm to rotate about the pivot pin. This rotation of the lever arm causes the center of gravity to move farther out from the pivot point to form a larger moment arm which thereby increases the torque applied by the lever arm to the pressure plate.

Viewed along the axis of rotation of the rotating clutch assembly, the centers of gravity for each of the series of lever arms form a circle. As the rotation speed increases, the centrifugal force causes the circle to increase in diameter. This causes the opposite end of the lever arm to exert a greater force against the pressure plate, which in turn results in a greater plate load being exxerted than the driver desires for a given r.p.m. In other words, when the driver now reaches a given r.p.m. there will be more energy transmitted to the back wheels due to the new increased plate load, and this can cause the tires to spin. This transmission of a greater amount of energy is termed "violence" because there is now too much energy being transmitted at the same engine rate of speed as before. Again, this is because the lever arm has been moved up an additional angle of about $1\frac{1}{2}°$ from its initial offset of about 2° to 3° to compensate for the wear on the clutch and this has produced additional centrifugal torque.

OBJECTS OF THE INVENTION

It is an object of the present invention to have a lever design where the yoke pivot pin hole and the pressure plate forging pivot pin hole are on-line and not offset, so that the line between these two holes is parallel to the beam line.

It is a further object of the invention to have the weight of the lever arm balance so that approximately 50 percent of the weight is inside the yoke pivot and 50 percent of the weight is outside of the pivot. By making the lever arm in this configuration and as thin as possible, a change of 1° in the lever angle of the lever arm (to compensate for the wear on the clutch pad) can be made without any substantial increase in the plate load at the same r.p.m. As a result the car will operate very smoothly and there will not be the violence which occurs in the existing clutches.

It is a further object to have a thrust shim positioned against the pressure plate forging driving lug which is attached to the pressure plate forging so the thrust shim can be worn away with use and so that the side of the pressure plate forging driving lug is not worn away.

These and other objects of the invention will become apparent as the description of this invention proceeds.

BRIEF DESCRIPTION OF THE DRAWINGS

FIG. 4 is a detailed sectional view of the lever assembly.

FIG. 5 is a sectional view of the lever assembly taken along line 5—5 of FIG. 4.

FIG. 6 is an exploded view of the pressure plate and the cover assembly.

FIG. 7 is a side view of a prior art lever.

FIG. 8 is a top view of the prior art lever of FIG. 7.

FIG. 9 is a side view of the lever according to the present invention.

FIG. 10 is a top view of the lever shown in FIG. 9.

FIG. 11 is an exploded perspective view showing the lever and related hardware.

DESCRIPTION OF THE PREFERRED EMBODIMENTS

Figure 1:
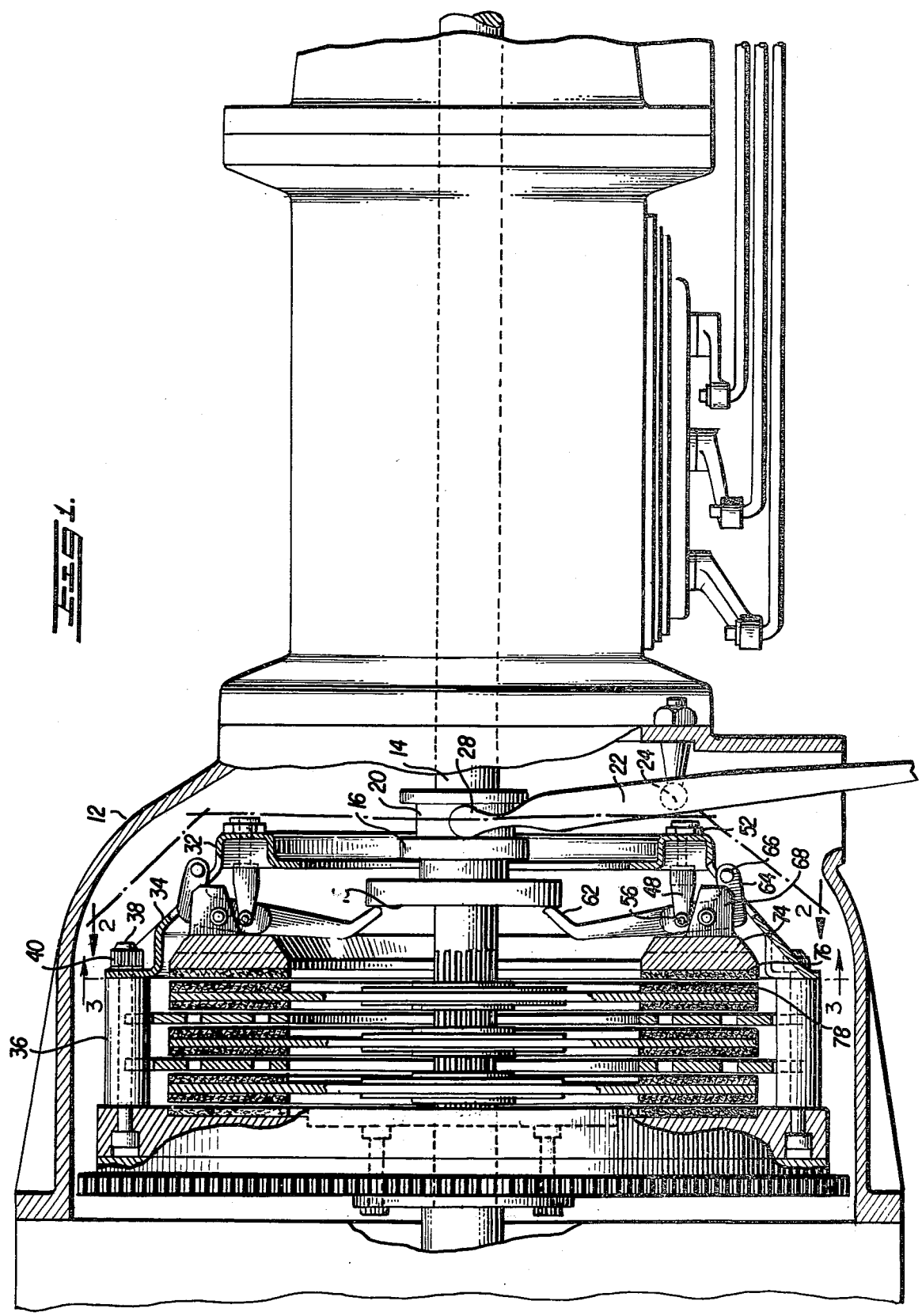
FIG. 1 is a sectional view of the racing clutch according to the present invention.

FIG. 1 illustrates the overall clutch assembly 10 with a clutch cover assembly 12 extending over the clutch assembly. Centered in the clutch assembly is a drive shaft 14 held by a ring member 16 having a flat surface 18 of the throw out bearing at one end for engaging the inernal ends of the clutch levers which are also known as the release points. The ring member 16 has one annular channel 20 for engagement with the clutch linkage by means of a clutch release fork 22. This clutch release fork pivots about pivot ball 24 and has each end 28 of the fork riding in the annular groove 20.

The pressure plate clutch assembly is shown generally as 32. It has an outside cover assembly 34 with a series of peripheral openings. The cover assembly attaches to the clutch pack assembly 36 when the openings on the cover assembly are placed over the bolts 38 extending from the pack assembly and the cover assembly is locked in place by the nuts 40. The design of the clutch pack assembly is a conventional design which is well known in the art.

One of the preferred embodiments of the pressure plate clutch assembly according to the present invention involves six lever assemblies spaced around the inside of the cover assembly. In FIG. 1 two of these lever assemblies are shown at the top and bottom of the figure. A yoke 48 is suspended from the cover assembly 34 by means of a threaded screw holder 50 (better illustrated in FIG. 4) having a locking nut 52. The screw holder 50 acts as a holder for an adjustment screw 54 inserted therein as shown in FIG. 4. The yoke 48 is made of two spaced apart elements having holes at the ends with a yoke pivot pin 56 passing between the two elements. A lever 58 is mounted on the pin between the two elements. To reduce wear on the yoke and lever, two lever shims 60 are mounted on the yoke pivot pin on each side of the lever in between the two forks of the yoke. These lever shims take up the wear that is encountered. They can readily be replaced and they have a low, economical cost.

The unique design of the lever of this invention will be discussed further in connection with FIGS. 9–11. It has an inner end 62, which is a release bearing point, and an outer end 64, which is the centrifugal point of adjustment, with a hole 66 for attachment of additional bob weights. The lever pivots about the yoke pivot pin 56 held by the yoke 48.

Suspended from an adjacent portion of the lever is the pressure plate forging driving lug 68 which straddles each side of the lever and which is attached to the lever by means of the pressure plate forging pivot pin 70. The pressure plate forging driving lug is attached to the pressure plate forging 74 which is in the form of a ring. On the opposite side of the forging ring is a friction material engaging surface 76. This surface of the pressure plate will engage the first friction surface 78 of the multiple clutch pack. Again the design of the clutch pack assembly is a conventional design which is well known in the art.

Figure 2:
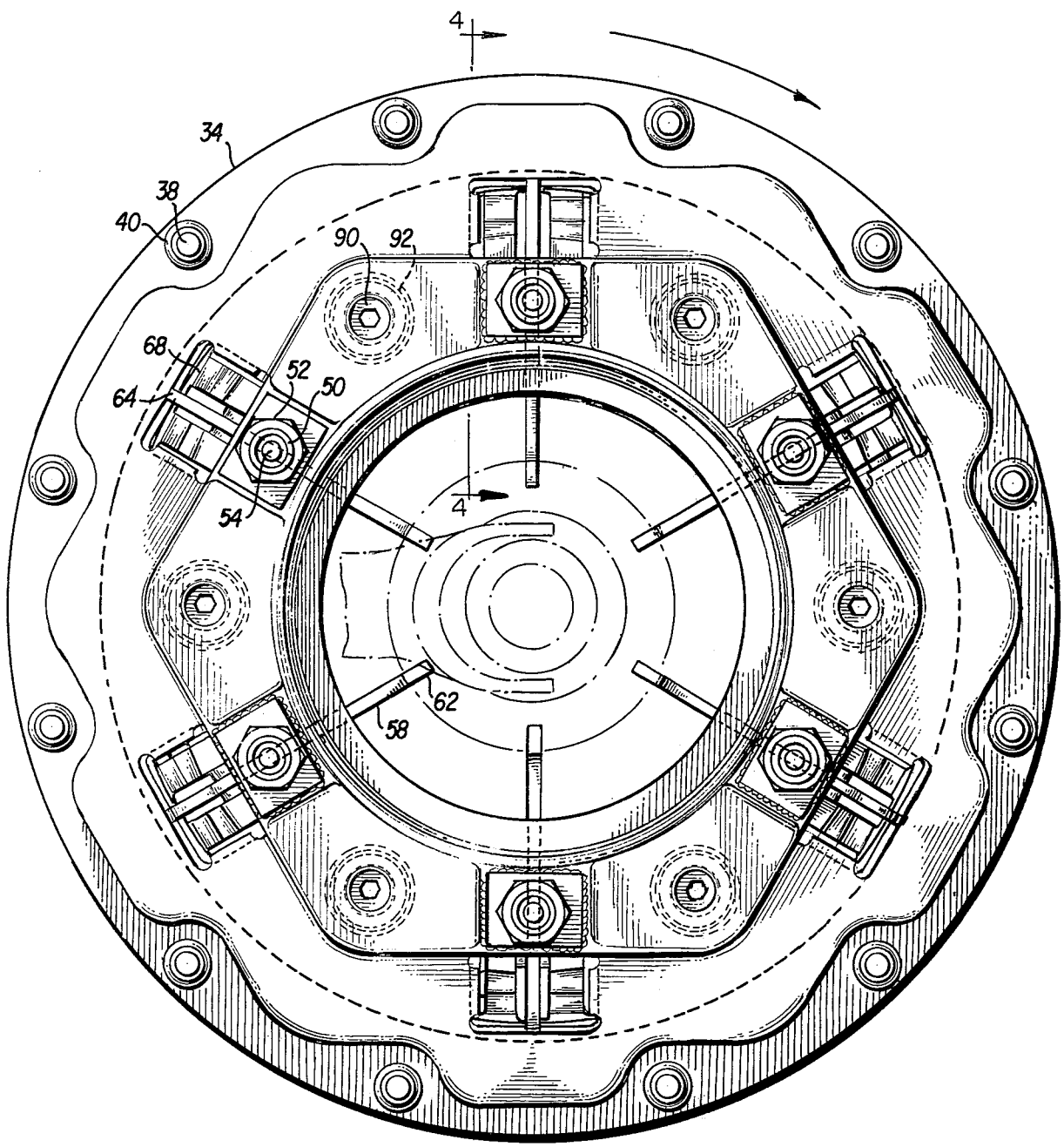
FIG. 2 is an end view of the pressure plate assembly looking from the outside end.

FIG. 2 is an end view of the pressure plate clutch assembly, illustrating the top outside surface of the cover assembly 34. Extending inwardly are the six levers 56, each having a terminal inner end known as the release bearing point 62. The cover assembly is attached to the rest of the device by sliding the peripheral holes in the cover assembly over the bolts 38 extending from the clutch pack and then locking the cover assembly in place with nuts 40, which secures the assembly to the clutch pack. This figure also illustrates the six pressure plate forging driving lugs 68 which engage the lever near the opposite external end 64. Shown in phantom are the six springs 92 under the cover assembly which are forcing the pressure plate forging ring away from the cover assembly. Also shown are the six Allen capscrews and spring adjusters 90 which are used to adjust the tension on the springs.

Figure 3:
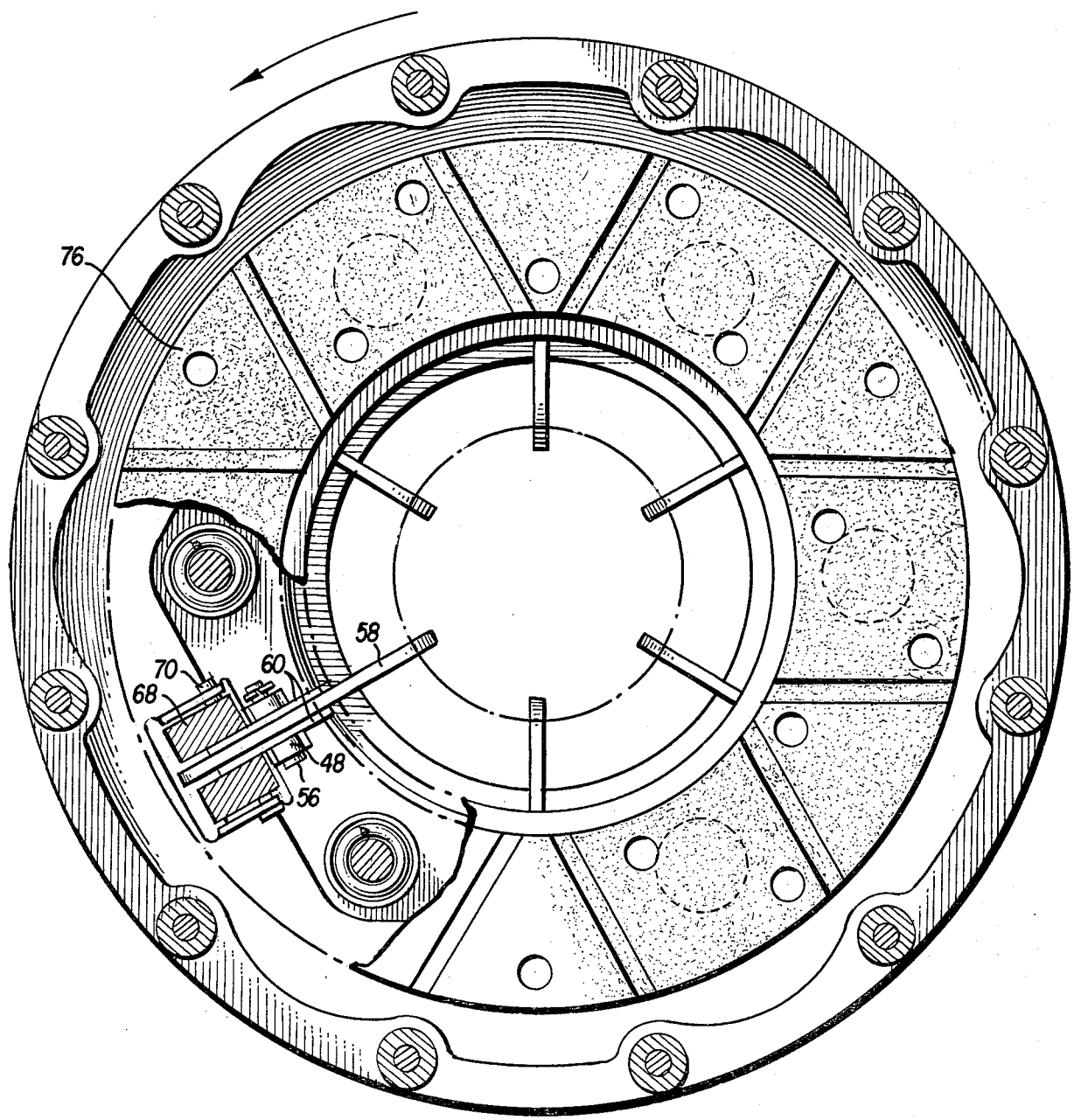
FIG. 3 is an end view of the pressure plate assembly looking at the inside end.

FIG. 3 is a bottom view of the pressure plate assembly which illustrates the friction surface 76 of the pressure plate. This is the surface that engages the clutch pack. The cutaway portion illustrates the lever 58 above the pressure plate which is held by the yoke pivot pin 56 extending through the two elements of the yoke 48 on either side of the lever. Also shown is the pressure plate forging driving lugs 68 with its pivot pin 70 passing through the lever and held by the two driving lugs of the pressure plate forging on either side of the lever. The two lever shims 60 are shown on either side of the lever 58.

FIG. 4 presents a detailed view of the lever assembly. Near the outer periphery of the cover plate 34 are six threaded lever adjuster sleeves 50 which screw through the threaded opening 120 in the cover assembly 34 as shown in FIG. 6. This FIG. 4 shows one of those sleeves in a cutaway view. The sleeve 50 is locked in place by the associated lock nut 52. Seated inside this threaded sleeve is the 12-sided yoke locking bolt 54 which extends down and makes threaded contact with the yoke 48. By turning the locking bolt 54 the yoke can be pulled up towards or pushed down away from the cover assembly 34. By the combined action of moving the sleeve 50, locking the sleeve in place with the nut 50 and then turning the locking bolt 54 to bring the yoke 48 in contact with the sleeve 50, one can position the yoke wherever desired. This view shows the yoke pivot pin 56 which is extending out from the plane of the paper and the lever shim 60 on this upper side of the lever. The pressure plate forging pivot pin 70 also is shown extending out from the plane of the paper in engagement with one side of the pressure plate forging driving lug 68. This pressure plate forging driving lug 68 is attached to one side of the pressure plate forging 74 with the opposite side having the friction material engaging surface 76. The external end 64 of the lever 58, which is the centrifugal point of the adjustment, extends out through an opening in the cover assembly 34 and has positioned an opening 66 at its far end for attachment of the bob weights.

FIG. 5 is a view taken along line 5—5 of FIG. 4. The lever 58 has lever shims 60 on either side. At the lower, inner portion is the yoke 48 with its two elements on either side of the lever and with the yoke pivot pin 56 extending therethrough. At the upper, more external position are two driving elements of the pressure plate forging driving lug 68 on either side of the lever and the pressure plate forging pivot pin 70 extending therethrough. This figure further shows the thrust shim 98 mounted on the outside of the pressure plate forging driving lug to protect the forging assembly. During use of the clutch, the cover assembly 34 will be pressing against and wearing away this surface of the pressure plate forging driving lug. By having these replaceable thrust shims 98, the wear on the forging surface can be prevented. This thrust shim is inexpensive and easily replaced. It saves wear on that one side of the pressure plate forging driving lug which would normally receive the most wear.

FIG. 5 also shows the bearing element or bushing 100 for the yoke pivot pin. This element fits around the yoke pivot pin 56 and fits inside the larger opening in the lever arm. Also shown is the bearing element or bushing 102 for the pressure plate forging pivot pin which likewise fits around the pressure plate forging pivot pin 70 and which fits into the larger opening in the lever arm.

FIG. 6 is an exploded view of the pressure plate forging ring 74 and the cover assembly 34. This view shows the six pressure plate forging driving lugs 68 wherein each of the driving lugs is made of two driving parts with a slot opening in the middle, through which the lever assembly fits. At the bottom opening between the two parts of the pressure plate forging driving lug 68 is a groove 110 formed which extends across the entire width of the pressure plate forging ring 74. This groove permits further rotation of the lever towards the opening in the pressure plate forging ring.

A hole 106 is formed through both of these driving parts of the pressure plate forging driving lug through which the pressure plate forging pivot pin 70 is inserted. The opposite surface of the pressure plate forging ring 74 has a friction surface 76. Spaced between the six pressure plate forging driving lugs 78 are six extending column guides 114. These serve as a support and guide for springs which are placed over each of the columns. The springs push the pressure plate away from the cover assembly 34 and in contact with the clutch pack. At the bottom of each of the column guides 114 where they extend from the pressure plate forging 74 is an annular depression 116 which serves as a seat for each of the springs.

This view in FIG. 6 shows the threaded openings 120 in the upper surface of the cover assembly 34 for the lever adjustment assembly. Six of these holes are spaced around the upper surface. Spaced between these six threaded holes 120 are six holes 122 in which is inserted the Allen capscrews and spring adjusters 90 for the springs 92.

FIGS. 7 and 8 present a side and top view of a prior art lever. This unit 130 has a yoke pivot pin hole 132 and a pressure plate forging pivot pin hole 134. The internal end is designated 136 and the external end is 138. As the lever is balanced about the yoke pivot pin, the weight distribution of these prior art levers is approximately 70 percent of the weight on the internal end side 136 with 30 percent of the weight on the external side 138. Furthermore, the line 135 defining the upper beam surface of the inner portion of the lever arm forms an angle of about 3 degrees with a line connecting the centers of holes 132 and 134.

The lever 58 according to the present invention is shown in the side and top views of FIGS. 9 and 10. These figures present an accurate view of the lever. The yoke pivot pin hole 142 and pressure plate forging pivot pin hole 144 are shown. The internal end is the release bearing point 62 and the external end 64 is the centrifugal point of adjustment. FIG. 9 illustrates a key feature of the present novel lever arm where the line 63 defining the upper beam surface is parallel to the line connecting the centers of holes 142 and 144. The opening 66 in the upper end 14 is for the attachment of additional bob weights to increase the centrifugal force that will be generated at the external end.

FIG. 10 shows the top view of the lever with the two lever shims 60 mounted adjacent to each side. One of the key features of the present invention is the design of this lever 58 so that when the lever is balanced on a pin extending through the yoke pivot pin hole 142, the weight distribution of the lever is approximately 50 percent of the weight on the internal side 62, with the other 50 percent of the weight being on the external side 64, although the center of gravity can be slightly on the inner side of the yoke pivot pin hole.

FIG. 11 is an exploded view of the lever assembly, showing the lever and the associated hardware. The lever 58 has the two lever shims 60 on each side. Since the yoke pivot pin opening 142 and pressure plate forging pivot pin opening 144 are larger than the respective yoke and pressure plate forging pivot pins, bushings 100 and 102 are inserted around the pins to fit snugly into the lever openings 142 and 144, as well as in the corresponding openings in the adjacent shims 60. The openings in each of the bushings 100 and 102 are just large enough to permit the yoke pivot pin and the pressure plate forging pivot pin to slide through.

The lever assembly is inserted into the pressure plate forging driving lug as follows. The lever assembly including the lever, the two adjacent lever shims and the bushing 102 are placed within the opening of the pressure plate forging driving lug. The pressure plate forging pivot pin is inserted first through one side of the driving element of the lug 68, then through the lever shim, the lever, the other lever shim and the other side of the driving element of the driving lug. Finally it is inserted through a thrust shim 98 placed adjacent the outer surface of the second side of the pressure plate driving lug where thrust forces will be encountered from the cover assembly.

To adjust the amount of centrifugal force developed by the present device, bob weights can be added to the centrifugal point of adjustment 64. This is accomplished by means of a screw or bolt 150 which passes through the opening 66 and which as a retaining nut 152 on the opposite end. Various bob weights designated 154 can be added to or removed from the bolt to provide the desired additional weight on the external side of the lever.

Figure 12:
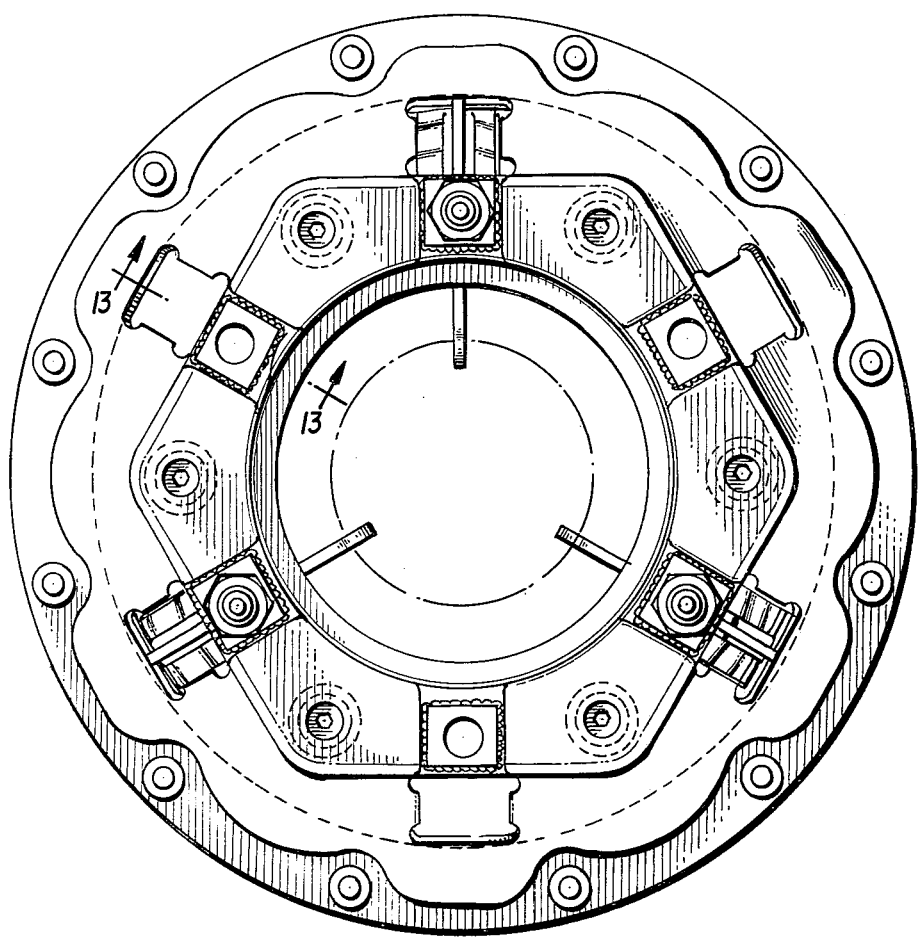
FIG. 12 is an end view of a further embodiment of the present invention having only three levers.
Figure 13:
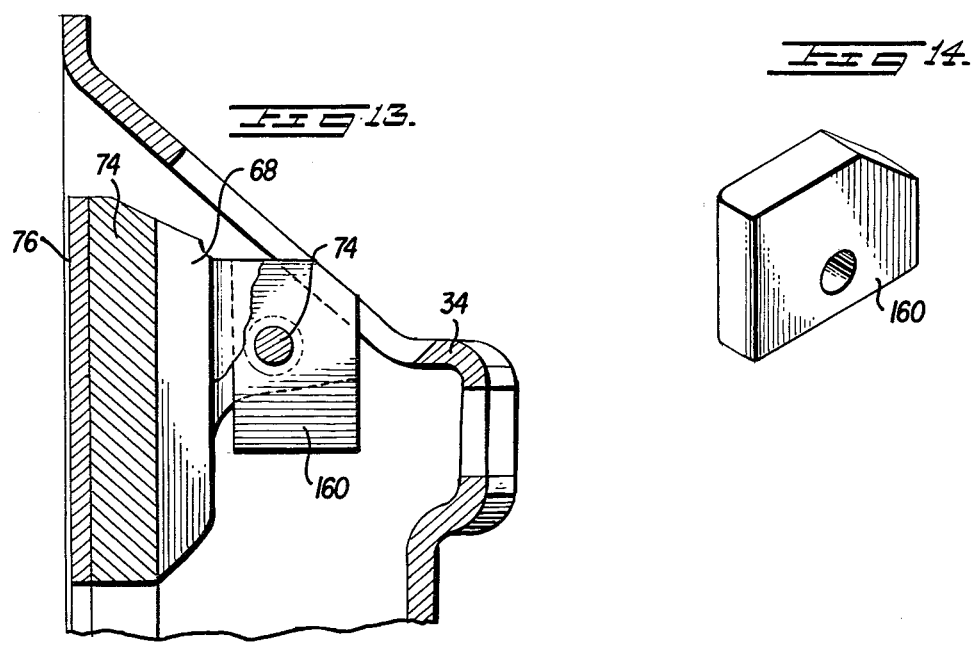
FIG. 13 is a detailed view of one of the three pressure plate forging driving lugs which does not have a lever in the embodiment shown in FIG. 12.
Figure 14:
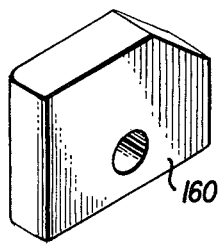
FIG. 14 is a perspective view of a dummy plug used in the embodiment of FIGS. 12 and 13.

FIGS. 12-14 illustrate a further embodiment of the invention when it is desired to use the present six-lever pressure plate ring 74 in vehicles which are adapted for a three-lever assembly. To do this, it is necessary to remove a lever assembly from every other pressure plate forging driving lug. To provide stabilizing weights in the three now empty driving lugs, a counterbalance weight known as a dummy plug 160 as shown in FIG. 14 is placed in these three driving lugs from which the levers have been removed as shown in FIG. 13. Thus, as seen in FIG. 12, the unit modified for this embodiment has just three levers extending internally, with the remaining three alternating driving lugs having only a dummy plug 160 that does not extend into the internal area.

Figure 15A:
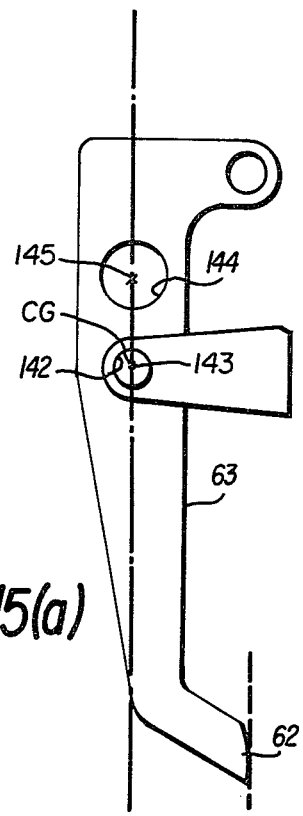
FIG. 15 is a schematic drawing showing the lever arm in comparison with the prior art lever arm.
Figure 15B:
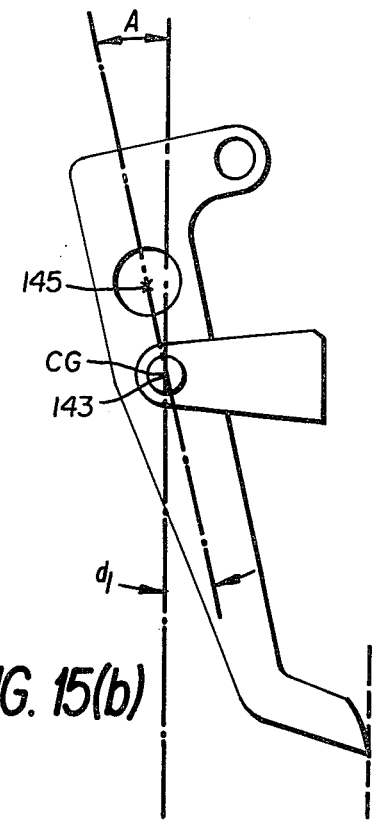

FIGS. 15(a) to 15(d) illustrate the significant difference in performance between the operation of a clutch with the present lever arm shown in FIGS. 9 and 10 and that of the prior art shown in FIGS. 7 and 8. Here each lever pivots about a pressure plate forging pivot pin in a forging driving lug assembly that is rotating as part of a rotating pressure plate forging ring. See FIG. 4 for the orientation of the lever arm with respect to the pressure plate forging 74 that is rotating about a horizontal axis. In FIG. 15(a) the lever according to the present invention is shown with the centers 143 and 145 of the two pivot holes 142 and 144, respectively parallel to the right side beam line 63 which is the top of the lever as seen in FIG. 9. The center of gravity, CG, is also on the common centerline between the holes near the yoke pivot pin hole 142. Here the lever angle between the centerline and the vertical is zero degrees. FIG. 15(b) illustrates the case where there has been a wearing away of the clutch pack so the lever arm is now inclined at an angle A. The center of gravity is now offset from the vertical by a small distance. This will produce a small centrifugal torque that will increase the force on the pressure plates. This force, however, is a relatively minor additional force.

Figure 15C:
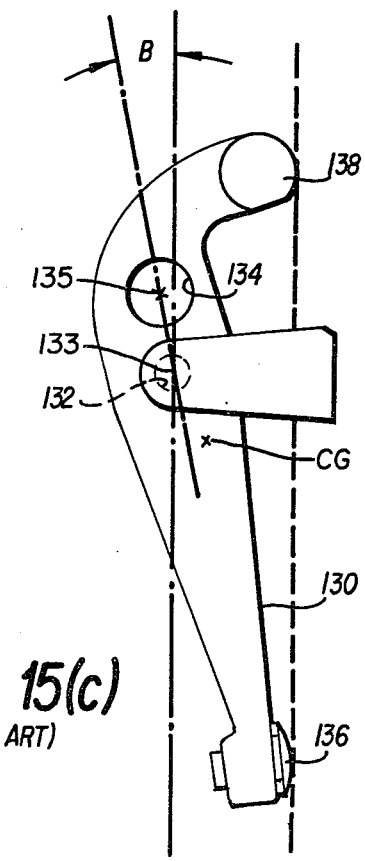
Figure 15D:
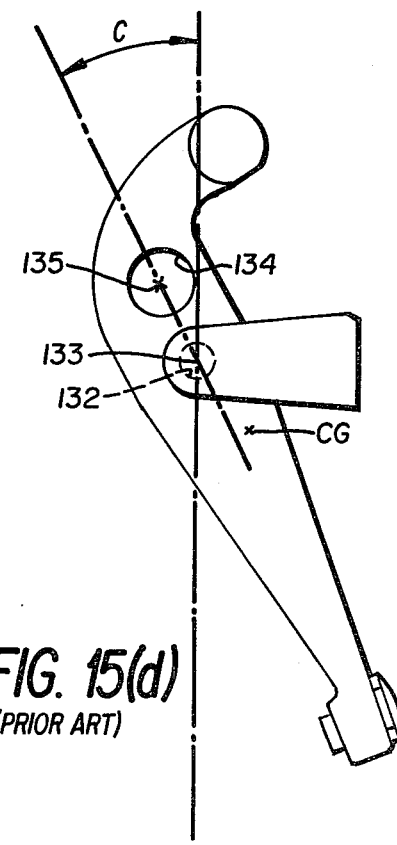

A comparison with the prior art lever illustrated in FIGS. 7 and 8 is made in FIGS. 15(c) and 15(d). In FIG. 15(c) the center 133 of the yoke pivot hole 132 of the prior art lever 130 is aligned directly below the center 143 of hole 142 of the present lever shown in FIG. 15(a). To show its orientation in comparable use, the lever is inclined so that the touching edge of the release bearing point 136 is at the same location beneath the corresponding edge of the release bearing point 62 of the present invention. It is seen that the line between the centers 135 and 133 of the holes 134 and 132 makes an angle B with the vertical. This angle is typically 2°–3°.

When the clutch pack wears away, the lever arm is further inclined in FIG. 15(d) so the release bearing point also moves over to the corresponding point under FIG. 15(b). The angle C made between the two holes is now significantly larger than the angle B and there has been a significant change in the geometrical orientation of the prior art lever. This results in a significant shift in the center of gravity, CG, of the lever which increases the internal centrifugal assist. The movement of the center of gravity substantially increases the centrifugal torque produced around the pivot pin so that a given r.p.m., there will be considerably more force acting on the pressure plate in FIG. 15(d) than was the case in FIG. 15(c). Due to the greater force, there will be more "violence" transmitted to the wheels because of the increased energy transmission.

The internal mass takes a more dominating effect in the prior art lever because of the increase in offset resulting from the offset in pivot holes 132 and 134 and because the internal mass is so much heavier in the prior art lever as compared to the present lever where the mass is about equally balanced.

By the use of the present lever arm design, the prior problem of increased violence is overcome.

What is claimed is:

1. In a clutch having
   a plurality of lever arms in a circular array, each pivoting about a yoke pivot pin which is maintained in a yoke holding element that extends about each side of the lever arm, and
   a pressure plate forging driving lug also engaging each lever arm, the improvement comprising using as the lever arm a long lever arm comprising
   a generally flat main longitudinal element having a top beam surface that extends in a generally straight line parallel to the longitudinal direction of the main element with one end defining an inner end and the opposite end defining an outer end;
   an upwardly extending release bearing point element at the inner end of the main element;
   an upwardly extending centrifugal point of adjustment element at the opposite outer end having a hole extending therethrough;
   a yoke pivot pin hole in the main element positioned so the amount of weight of the lever on either side is about equal; and
   a pressure plate forging pivot hole in the main element positioned between said centrifugal point of adjustment element and said yoke pin pivot hole, said yoke pivot pin and pressure plate forging pivot pin holes being positioned so a line connecting their centers is parallel to the line of said top beam surface.

2. A clutch according to claim 1, further comprising adjustable weight means attached to the lever by means extending through the hole in the centrifugal point of adjustment element.

3. A clutch according to claim 1, when there are six lever arms.

4. A clutch according to claim 1, further comprising a shim adjacent each side of the lever between the lever and the inner side of the yoke and the pressure plate forging driving lug.

5. A clutch according to claim 1, further comprising a thrust shim on the outside of the pressure plate forging driving lug.

6. A clutch according to claim 1, wherein the number of lever arms is reduced by replacing alternating lever arms with a short, dummy counter balancing plug held in the pressure plate forging driving lug which balances the weight of the replaced lever arm.

7. A clutch according to claim 4, further comprising adjustable weight means attached to the lever by means extending through the hole in the centrifugal point of adjustment element.

8. A clutch according to claim 6, further comprising a shim adjacent each side of the lever between the lever and the inner side of the yoke and the pressure plate forging driving lug.

9. A clutch according to claim 6, further comprising a thrust shim on the outside of the pressure plate forging driving lug.

10. A clutch according to claim 4, wherein there are three lever arms and three dummy counter balancing plugs.

11. A long lever arm for use in a clutch comprising
    a generally flat main longitudinal element having a top beam surface that extends in a generally straight line parallel to the longitudinal direction of the main element with one end defining an inner end and the opposite end defining an outer end;
    an upwardly extending release bearing point element at the inner end of the main element, an upwardly extending centrifugal point of adjustment element at the opposite outer end having a hole extending therethrough;
    a yoke pivot pin hole in the main element positioned so the amount of weight of the lever on either side is about equal; and
    a pressure plate forging pivot pin hole in the main element positioned between said centrifugal point of adjustment element and said yoke pivot pin hole, said yoke pivot pin and pressure plate forging pivot pin holes being positioned so a line connecting their centers in parallel to the line of said top beam surface.

12. A lever arm according to claim 11, further comprising adjustable weight means attached to the lever by means extending through the hole in the centrifugal point of adjustment element.

* * * * *